US007098787B2

(12) United States Patent
Miller

(10) Patent No.: US 7,098,787 B2

(45) Date of Patent: Aug. 29, 2006

(54) SYSTEM AND METHOD FOR SIGNALING EMERGENCY RESPONSES

(75) Inventor: John D. Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 10/448,677

(22) Filed: May 29, 2003

(65) Prior Publication Data

US 2004/0239498 A1 Dec. 2, 2004

(51) Int. Cl.
*G08B 1/08* (2006.01)
*H04M 11/04* (2006.01)

(52) U.S. Cl. .......................... 340/539.18; 340/539.13; 340/539.2; 340/539.23; 340/628; 340/825.36; 379/37; 379/40; 379/45; 455/404.2

(58) Field of Classification Search .......... 340/539.11, 340/539.18, 539.13, 539.23, 539.2, 539.21, 340/539.16, 539.17, 825.36, 825.49; 379/37, 379/38, 45; 455/404.2, 404.1
See application file for complete search history.

(56) References Cited

U.S. PATENT DOCUMENTS 5,835,907 A * 11/1998 Newman .................... 707/10
5,946,618 A * 8/1999 Agre et al. ................ 455/428
6,138,026 A * 10/2000 Irvin ...................... 455/456.3
6,362,778 B1 * 3/2002 Neher .................. 342/357.07
6,459,371 B1 * 10/2002 Pike ........................ 340/539.1
6,816,720 B1 * 11/2004 Hussain et al. .......... 455/404.2
2003/0207670 A1 * 11/2003 Fernandez et al. ......... 455/12.1

* cited by examiner

*Primary Examiner*—Donnie L. Crosland
(74) *Attorney, Agent, or Firm*—Crystal D. Sayles

(57) ABSTRACT

A system and method for signaling emergency responses. A mobile device receives proximity location information from at least one location identification beacon. A user of the mobile device dials an emergency telephone number when an emergency occurs. Dialing the emergency telephone number enables the proximity location information to be transmitted to an emergency call center. Upon receipt of the proximity location information by the emergency call center, a globally unique identifier within the proximity location information is extracted and mapped to a database to obtain a precise location of the emergency, thereby enabling a dispatcher to better instruct an emergency response team as to the location of the emergency without requiring the user to provide the location.

45 Claims, 6 Drawing Sheets

SYSTEM AND METHOD FOR SIGNALING EMERGENCY RESPONSES

FIELD OF THE INVENTION

The present invention is generally related to location-awareness in an emergency situation. More particularly, the present invention is related to a system and method for providing location information to a local Public Safety Answering Point (PSAP) or other emergency call center during 911 calls (or other emergency number calls) using a mobile device.

DESCRIPTION

Reports from the Consumer & Governmental Affairs Bureau indicate that the number of 911 calls placed by people using wireless phones is approximately 50 million per year and climbing. Wireless 911 calls come from people seeking help in an emergency situation as well as "Good Samaritans" reporting traffic accidents, crimes, and other emergency situations.

Although wireless phones can be important public safety tools, they also present unique challenges for public safety and emergency response personnel. For example, a wireless phone is mobile, and therefore is not associated with any one fixed location or address. Thus, a caller using a wireless phone may be calling from anywhere. While the location of a cell tower used to carry a 911 call may provide a general indication of the location of the caller, that information is usually not specific enough to enable public safety and emergency response personnel to promptly deliver assistance to the caller.

Federal Communications Commission (FCC) wireless Enhanced 911 (E911) rules seek to improve the effectiveness and reliability of wireless 911 service by providing 911 dispatchers (i.e., public safety and emergency response personnel) with additional information on wireless 911 calls. At present, when a wireless 911 call is received by a 911 dispatcher, the caller must provide the 911 dispatcher with the location of the emergency and should also provide the wireless phone number so that if the call gets disconnected, the 911 dispatcher may contact the caller. Often times, the caller may not be able to provide the 911 dispatcher with the location for various reasons. For example, the caller may not know the exact location of his/her whereabouts. In some situations, the caller may have a medical condition that may prevent him/her from being able to provide location information. Other times, the caller may be in an emergency situation, such as, but not limited to, a crime, that prevents him/her from providing such information.

A FCC E911 mandate requires wireless carriers to provide more precise location information to within 50 to 100 meters. This mandate will allow wireless cell phone users to make 911 calls without having to provide an exact location as to their whereabouts.

Thus, what is needed is a system and method for signaling an emergency without having to provide a description of the actual location. What is further needed is a system and method for enabling a mobile device to automatically provide the actual location when signaling an emergency.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to systems and methods for enabling automatic location awareness during emergency 911 calls or distress calls from a mobile device. Although embodiments of the present invention are described with respect to emergency 911 calls and distress calls directed to 911 public safety and emergency response personnel, other emergency call numbers may also be used. Although embodiments of the present invention are described with respect to emergency or distress situations, non-emergency situations are also applicable using non-emergency call numbers and non-emergency response personnel. Embodiments of the present invention are also described with respect to room-accurate E911 calls in a building. One skilled in the relevant art(s) will know that other environments, such as outdoor environments having location identifying beacons and enhanced alarm infrastructures may also be used.

Figure 1:
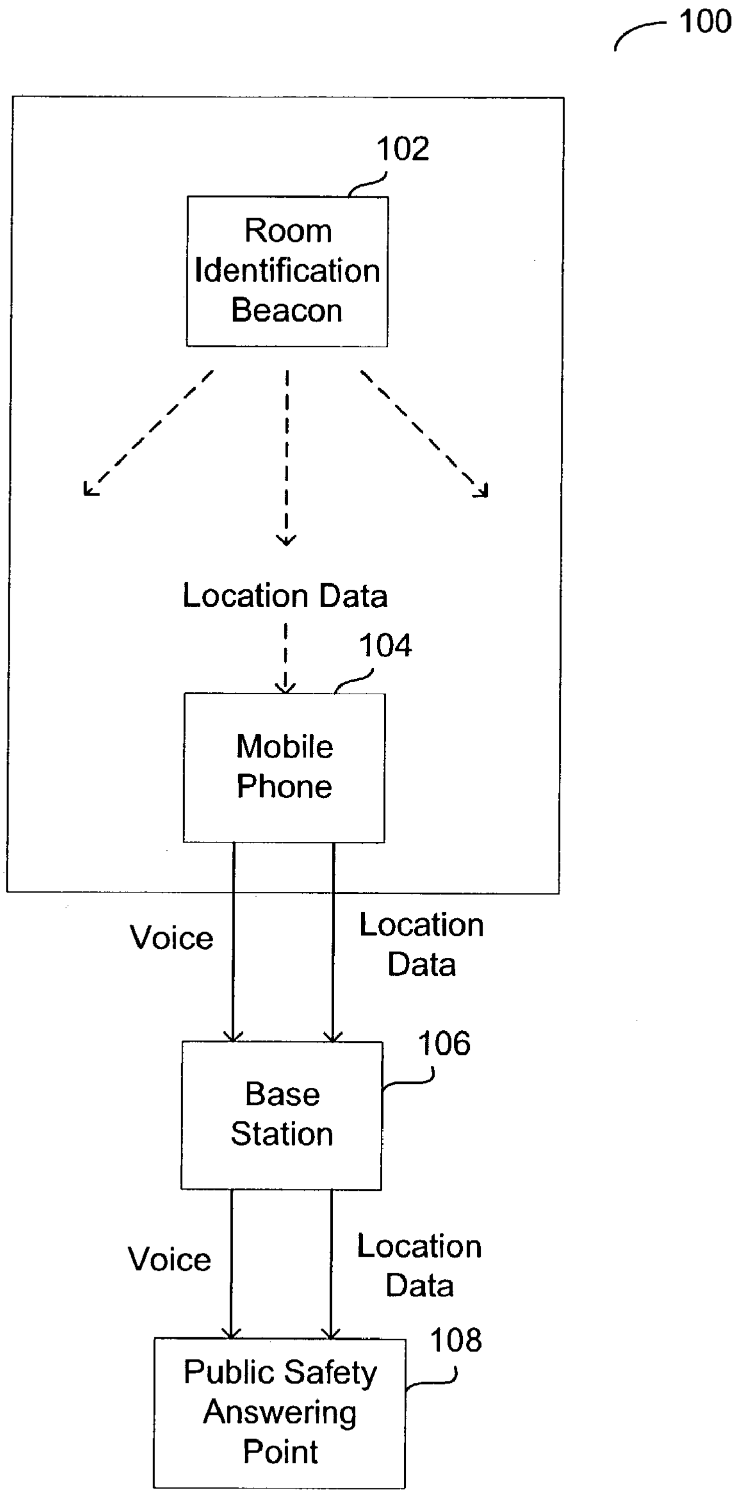
FIG. 1 is an exemplary diagram illustrating room-accurate E911 calls using a mobile device and room-identifying location beacon according to an embodiment of the present invention.

FIG. 1 is an exemplary diagram illustrating a room-accurate E911 system according to an embodiment of the present invention. Room-accurate E911 system 100 comprises a location identification beacon 102 and a person having a mobile device 104, both of which are located within a room in a building. Location identification beacon 102 may be a short range location beacon using radio frequency identification (RFID), infrared (IR), ultra wide band (UWB), Bluetooth, or any other short-range communication technology that can "chirp" a unique identifier that identifies the current room or space. Mobile device 104 may be a cell phone, a pager, a personal digital assistant, a distress call button, or any other mobile device that may be capable of receiving proximity location signals from location identification beacon 102. To receive the proximity location signals, mobile device 104 may include an additional radio transmitter/receiver or an infrared (IR) port, or any other receiver/transmitter means for receiving proximity location signals. In one embodiment, the radio transmitter/receiver may be a radio on a piece of silicon.

Location identification beacon 102 periodically chirps a proximity location signal. The proximity location signal comprises a globally-unique identifier (GUID). Globally-unique identifiers are well known to those skilled in the relevant art(s). The globally-unique identifier may be registered with a local Public Safety Answering Point (PSAP) 108 or some other emergency call center. The proximity location signal may also include other information, such as street address information, latitude/longitude information, floor number, room number, text describing the building (e.g., "Company: ABC Corporation", "Building: ABC2", "Location: ABC2-A8"), etc.

In response to an emergency, a person having mobile device 104, such as, for example, a person with a cell phone, may dial 911 (or some other emergency number) to connect to PSAP 108 (or some other emergency response team) via base station 106. Dialing 911 also causes mobile device 104 to transmit the location information received from location identification beacon 102 to PSAP 108. The location information may be transmitted using Short Message Service (SMS), Wireless Access Protocol (WAP), or any other suitable transmission means. SMS and WAP are well known to those skilled in the relevant art(s).

Upon answering the 911 call (or other emergency number call), a 911 dispatcher (or other emergency response team employee) will receive the location information. The location information may be used to better instruct an emergency response team to respond to the emergency. For example, using the GUID from the location information, the 911 dispatcher (or other emergency response team employee) may retrieve detailed information about the precise location of the occurrence of the emergency (by knowing the location of location beacon 102) from a database. The detailed information may contain, but is not limited to, recommended street routes to the building, recommended stairway access, and any other information that may enable the response team to respond to the emergency in a timely and efficient manner. In an embodiment where the location information includes a user-friendly description of the location (i.e., street address, room number, floor number, etc.), the user friendly description may also be displayed to the caller using mobile device 104 to inform the caller of the exact location.

In one embodiment, location identification beacon 102 may be piggy-backed on to an existing infrastructure, such as a smoke detector. Smoke detectors are already wired and regularly spaced within commercial buildings. Thus, their locations are already well-known to public safety and response team personnel. In this embodiment, a 911 dispatcher (or other response team employee) may receive multiple 911 calls (or other emergency number calls) via mobile device 104 over a landline connection through the smoke detector. To indicate that the emergency is not related to fire, the smoke detector may provide a different alarm warning.

Figure 2:
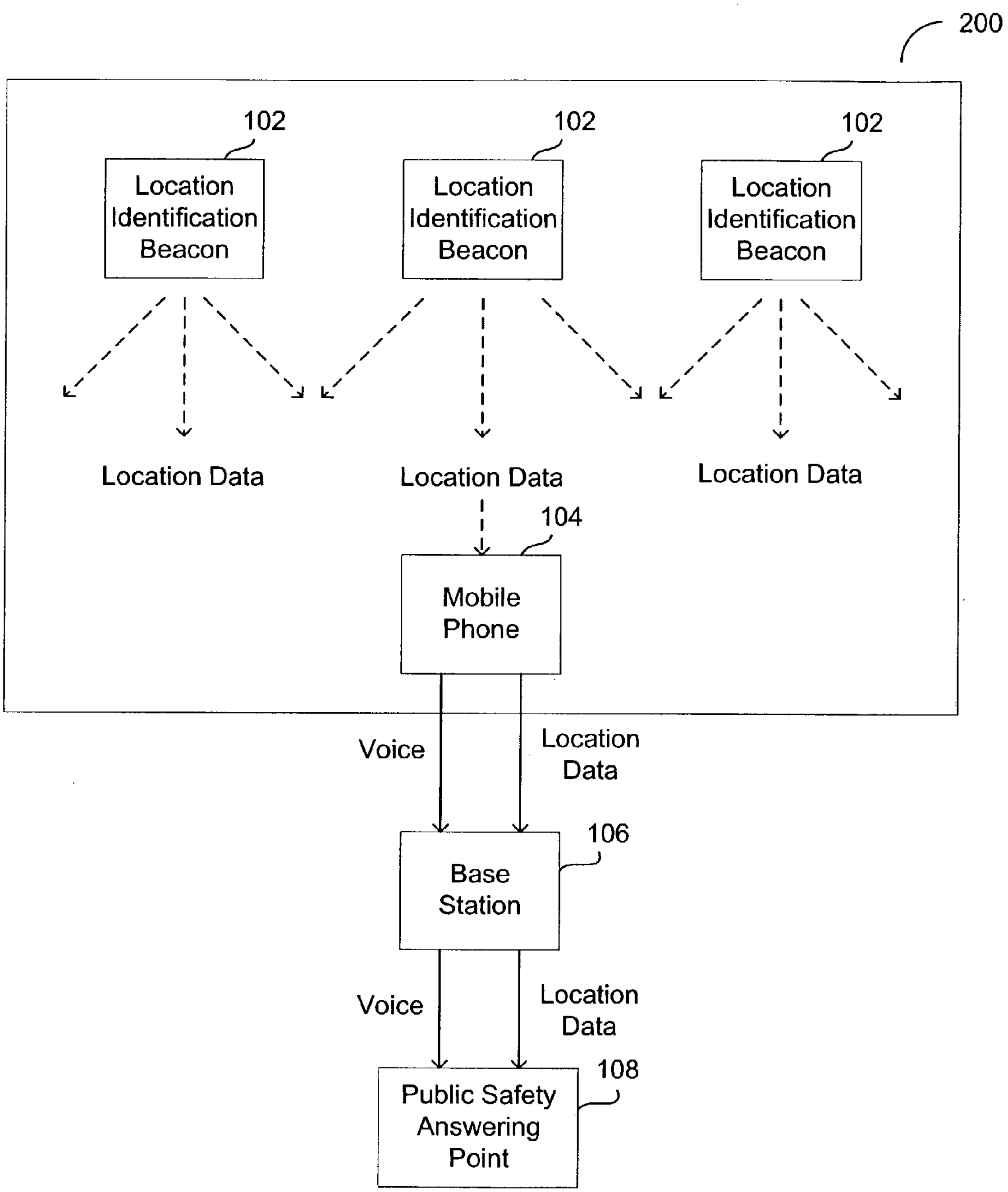
FIG. 2 is an exemplary diagram illustrating room-accurate E911 calls using a mobile device and a plurality of room-identifying location beacons according to an embodiment of the present invention.

FIG. 2 is an exemplary diagram illustrating room-accurate E911 calls using a mobile device and a plurality of room-identifying location beacons according to an embodiment of the present invention. In this embodiment, a plurality of location identification beacons 102 may be dispersed throughout the room for finer-grain location reporting purposes. Mobile device 104 may receive location information from more than one of location identification beacons 102. In one embodiment, mobile device 104 may transmit the location information from the nearest location identification beacon 102. In another embodiment, mobile device 104 may send each of the location information signals, one at a time. In yet another embodiment, mobile device 104 may process all of the location information signals into one signal and transmit that one signal to PSAP 108 (or other emergency call center) when a person makes a 911 call or other emergency call.

Figure 3:
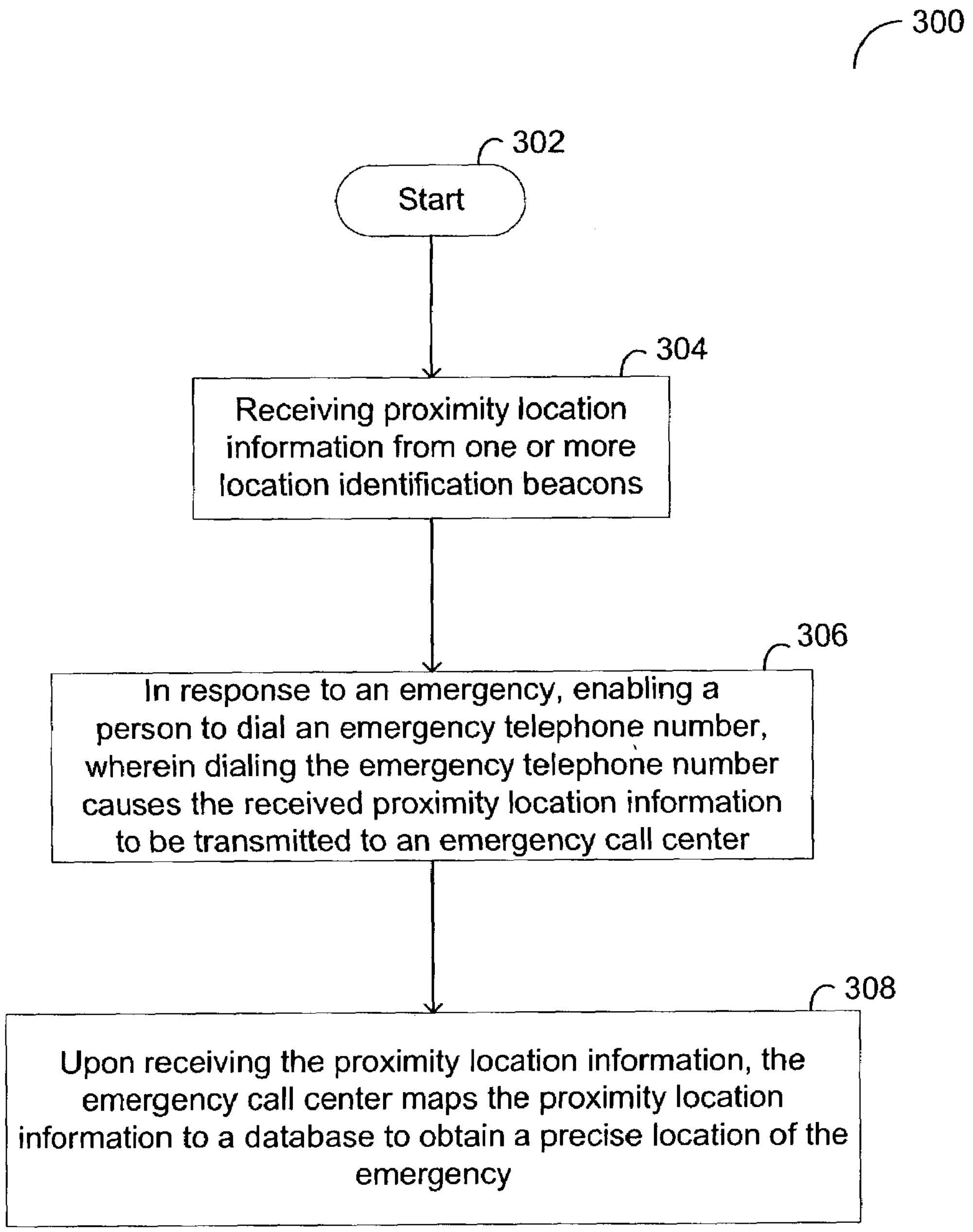
FIG. 3 is an exemplary flow diagram describing a method for enabling room-accurate E911 calls using a mobile device and one or more room-identifying location beacons according to an embodiment of the present invention.

FIG. 3 is an exemplary flow diagram 300 for enabling room-accurate E911 calls using a mobile phone and room-identifying location beacons according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, mobile device 104 periodically receives proximity location information from one or more location identification beacons 102. In the case of an emergency, a person having mobile device 104 may dial 911 (or some other emergency number) in block 306. Dialing 911 (or some other emergency number) enables the proximity location information received by mobile device 104 to be sent to PSAP 108 (or another emergency call center) via base station 106. In one embodiment, mobile device 104 may process the proximity location information by adding additional data to the proximity location information. The additional data may include, but is not limited to, the caller's name, the cell phone number, a person to call in case of emergency, medical information about the caller (assuming that the caller is the person in need of emergency help), etc. This information may be stored on the mobile device in a preferences file. Additional data may also include location information from other sources, such as a global positioning system (GPS), a wireless local area network (LAN), distance measuring, etc.

In an embodiment where mobile device 104 may include body sensors, such as, but not limited to, a temperature sensor, a pulse sensor, and a heartbeat sensor, temperature, pulse, and/or heartbeat information may also be sent to PSAP 108 or some other emergency call center.

In block 308, a 911 (or other call center) dispatcher at PSAP 108 (or other emergency call center) receives the emergency call along with the proximity location information and any other information transmitted from mobile device 104. The GUID contained in the proximity location information enables the 911 dispatcher to retrieve detailed location information from a database. The detailed information may contain recommended street routes to the building, recommended stairway access, and any other information that might make the response team's actions more timely and more effective. This eliminates the caller from having to provide location information as well as the telephone number of the cell phone being used.

Figure 4:
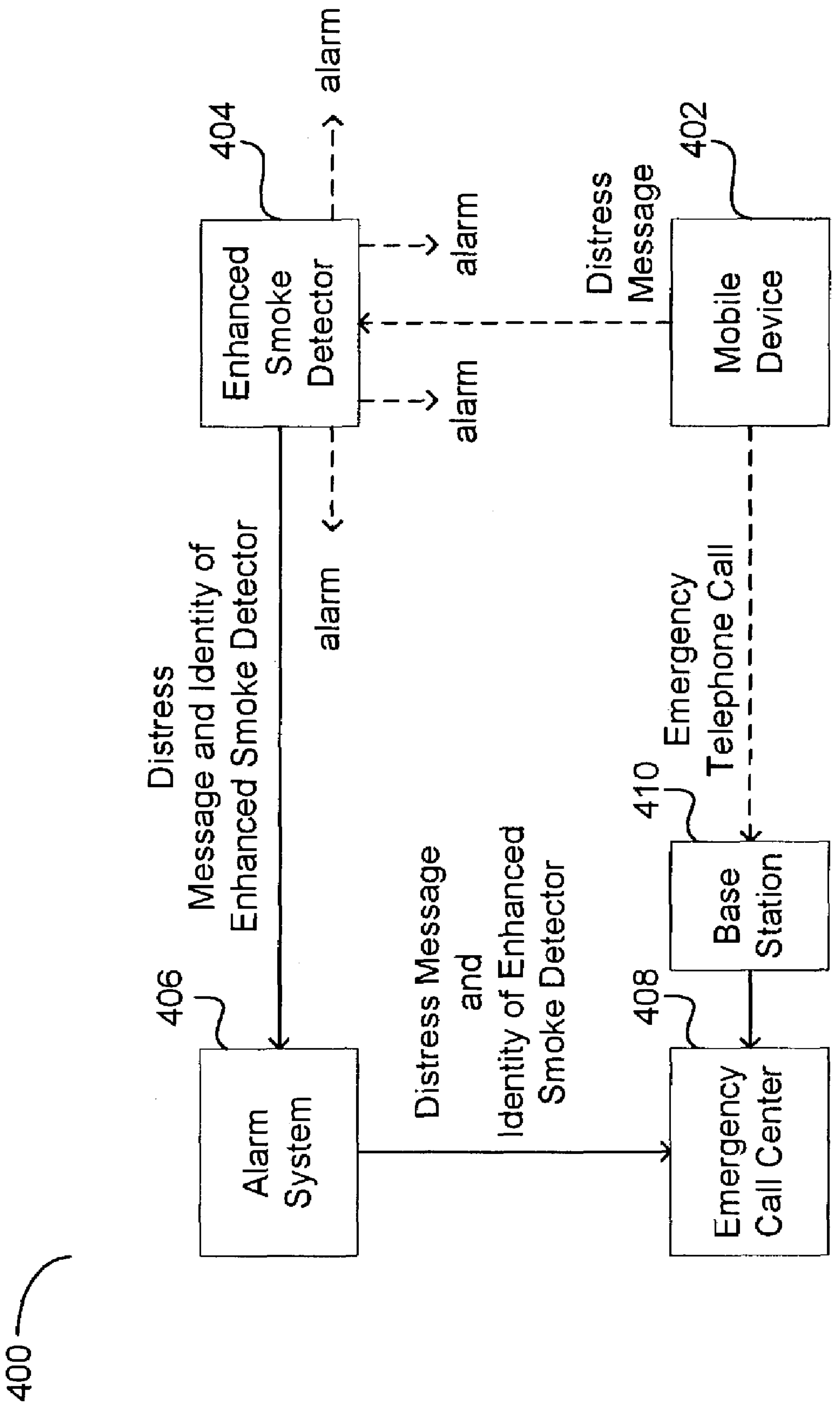
FIG. 4 is an exemplary diagram illustrating room-accurate distress calls using a mobile device and enhanced building alarm infrastructures.

In yet another embodiment of the present invention, a mobile device may act as a beacon to disperse distress calls when combined with building alarm system infrastructures. FIG. 4 is an exemplary diagram illustrating a system 400 for room-accurate distress calls using a mobile device and enhanced building alarm infrastructures. System 400 comprises a person having a mobile device 402, an enhanced smoke detector 404, and an alarm system infrastructure 406. Mobile device 402 may include, but is not limited to, a cell phone, a pager, a personal digital assistant (PDA), a distress call button, or any other mobile device able to transmit a distress message using radio frequency identification (RFID), infrared (IR), ultra wide band (UWB) Bluetooth, or any other short-range transmission means. In one embodiment, the transmission means for mobile device 402 may be a radio transmitter/receiver implemented on a piece of silicon. Enhanced smoke detector 404 may be a smoke detector having a receiver capable of receiving a short-range distress message from mobile device 402. Enhanced smoke detector 404 is identified using a GUID. Enhanced smoke detector 404 is wired to alarm system infrastructure 406. Alarm system infrastructure 406 may therefore provide direct access to a PSAP 408 or other emergency call center.

In response to an emergency situation, a person dialing 911 (or any other emergency call number) from mobile device 402, such as a person having a cell phone, also enables mobile device 402 to transmit a distress message. The distress message may include, but is not limited to, the caller's name, telephone number, or any other information useful for identifying the caller. Enhanced smoke detector 404, upon receiving the distress message will signal an alarm with alarm system infrastructure 406. The alarm may be different from an alarm indicating a fire to indicate a different type of emergency situation. In commercial buildings, the location of each smoke detector is well-known to PSAP 408 and other emergency call centers. Alarm system infrastructure 406 will in turn transmit the distress message along with a GUID from enhanced smoke detector 404 to PSAP 408 or another emergency call center to enable public safety and emergency response personnel to respond to the emergency in a timely fashion. Again, a dispatcher will use the GUID for enhanced smoke detector 404 to obtain the exact location information for the emergency from a database.

Thus, using an existing alarm system infrastructure to report such emergencies enables public safety and emergency response personnel to respond in a timely and efficient manner using the location of the smoke detector that received the distress message. Also, when mobile device 402 cannot obtain service within the emergency location to enable mobile device 402 to be connected to PSAP 408 or any other emergency location, the distress message and the location of the emergency may be transferred to PSAP 108 (or another emergency call center) from enhanced smoke detector 404 over a landline using alarm system infrastructure 406.

Figure 5:
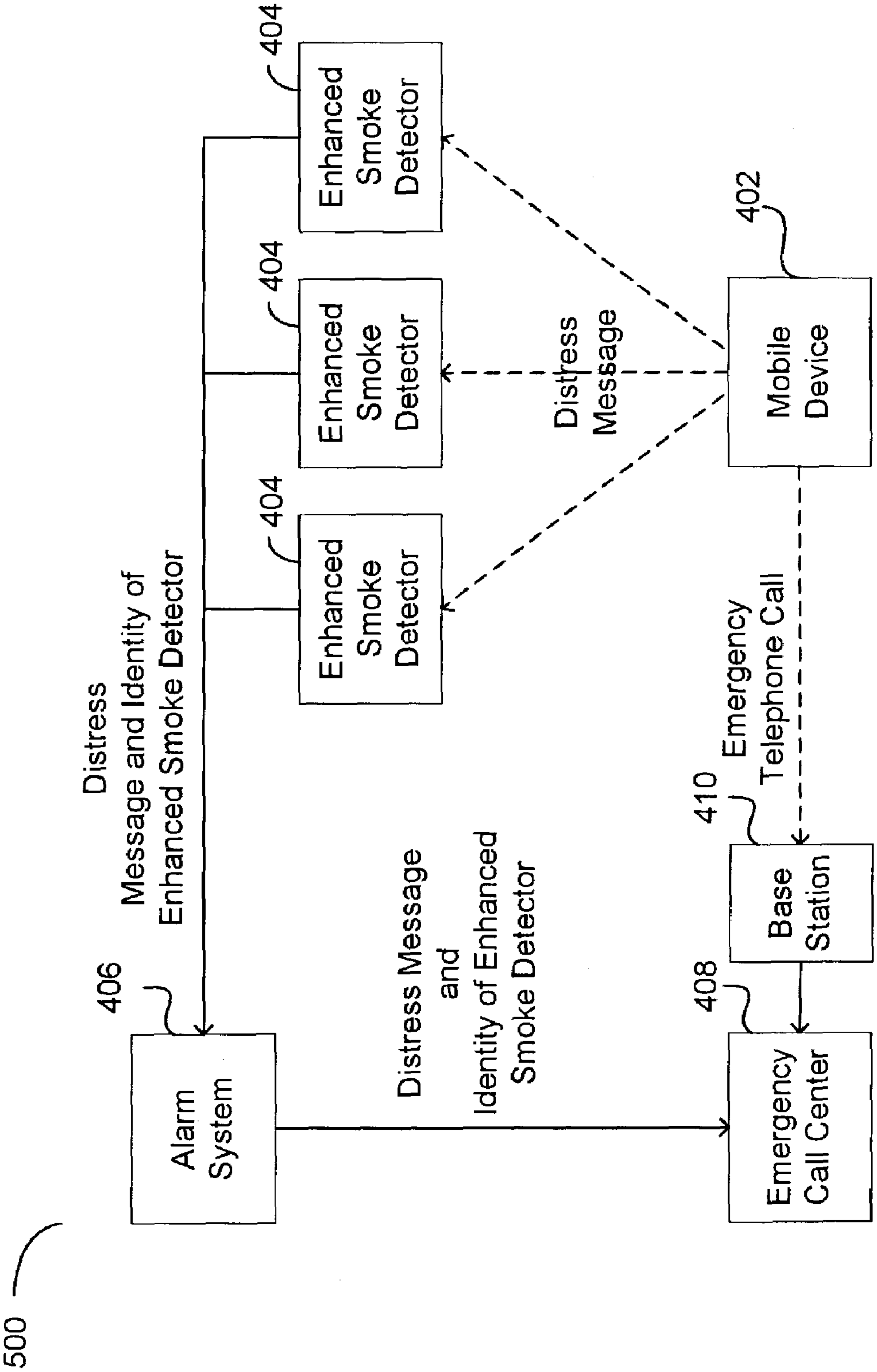
FIG. 5 is an exemplary diagram illustrating room-accurate distress calls using a mobile device and an enhanced building alarm infrastructure having a plurality of enhanced smoke detectors according to an embodiment of the present invention.

FIG. 5 is an exemplary diagram illustrating room-accurate distress calls using a mobile device and an enhanced building alarm infrastructure having a plurality of enhanced smoke detectors according to an embodiment of the present invention. In this embodiment, a plurality of enhanced smoke detectors 404 may be dispersed throughout the room for finer-grain location reporting purposes. In one embodiment, more than one enhanced smoke detector 404 may obtain the distress signal and alarm system infrastructure 406 may transmit the distress signal received from each enhanced smoke detector 404 along with the GUID of each enhanced smoke detector 404 to PSAP 408 or another emergency call center. In another embodiment, alarm system infrastructure 406 may only transmit the strongest distress message received by one of enhanced smoke detector 404 along with the GUID of enhanced smoke detector 404 to PSAP 408 or another emergency call center.

Figure 6:
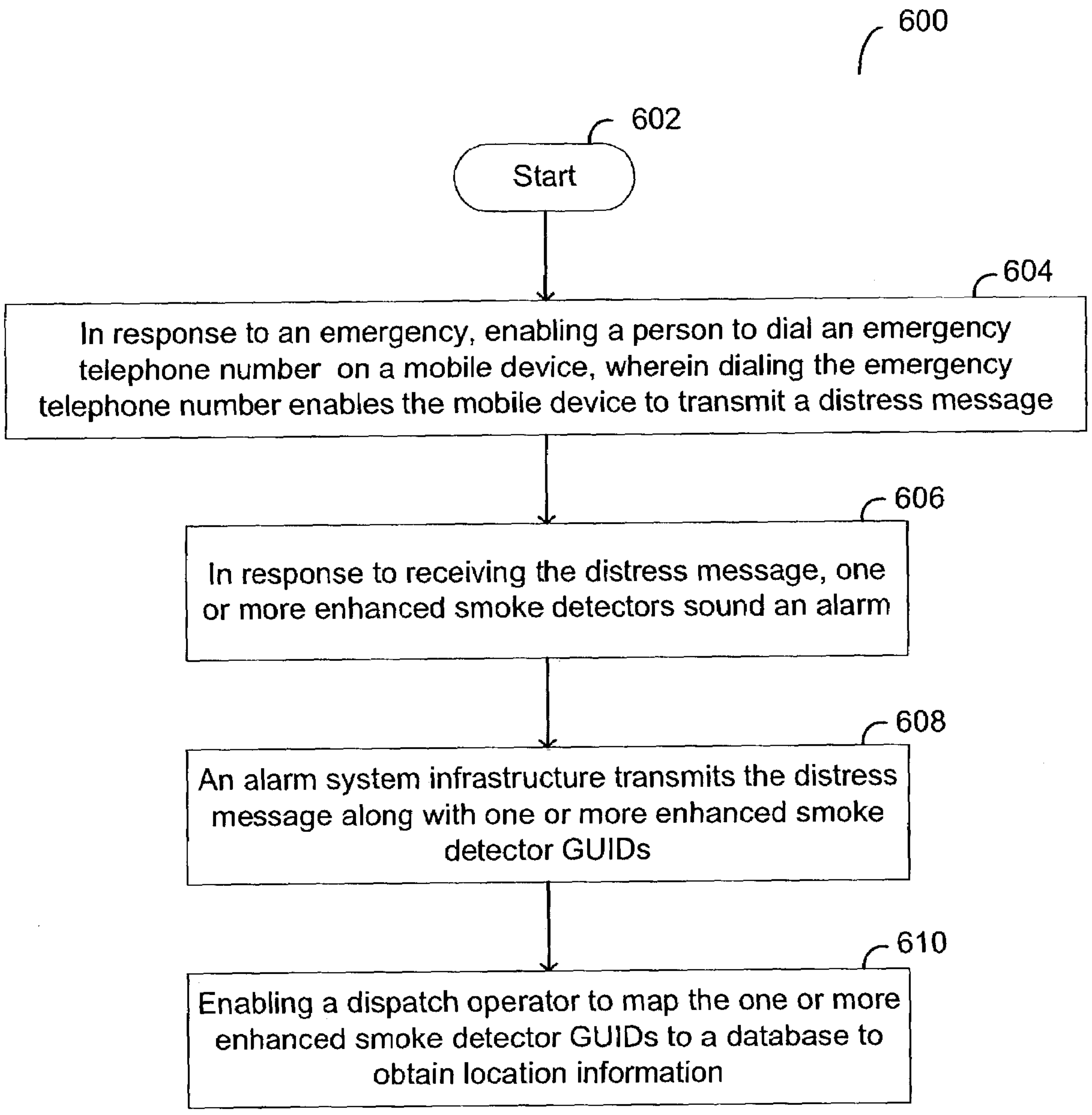
FIG. 6 is an exemplary flow diagram describing a method for enabling room-accurate distress calls using a mobile device and enhanced building alarm infrastructures according to an embodiment of,the present invention.

FIG. 6 is an exemplary flow diagram 600 describing a method for enabling room-accurate distress calls using a mobile device and enhanced building alarm infrastructures according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. The process begins with block 602, where the process immediately proceeds to block 604.

In block 604, in response to an emergency, a person dials 911 (or some other emergency call number) on their mobile device 402. Dialing 911 (or some other emergency call number) enables mobile device 402 to transmit a distress message using a short-range transmission signal to one or more enhanced smoke detectors 404. The distress message may include, but is not limited to, the name of the owner of mobile device 402, the phone number of mobile device 402, the electronic serial number for mobile device 402, a person to call in case of emergency, medical information about the caller or any other information useful for identifying the caller.

In block 606, one or more enhanced smoke detectors 404 may sound an alarm that is transmitted to alarm system infrastructure 406. The alarm may be different from a fire alarm sound to discern between a fire and another type of emergency.

In block 608, alarm system infrastructure 406 transmits the distress message along with one or more enhanced smoke detector GUIDs to PSAP 408 or another emergency call center.

In block 610, a 911 dispatcher (or other emergency employee) may map the one or more enhanced smoke detector GUIDs to a database to obtain location information. The location information may include, but is not limited to, the street address information, latitude/longitude information, floor number, room number, text describing the building (e.g., "Company: ABC Corporation", "Building: ABC2", "Location: ABC2-A8"), etc. Other important information may include recommended street routes to the building, recommended stairway access, and any other information that might make the response team's actions timely and more effective in responding to the emergency situation. This eliminates the caller from having to provide location information as well as the telephone number of the mobile device being used.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for location-awareness comprising:

receiving proximity location information comprising a globally unique identifier (GUID) from one short range location identification beacon that periodically chirps the proximity location information; and enabling a user to dial an emergency telephone number if an emergency occurs, wherein dialing the emergency telephone number enables the proximity location information to be transmitted to an emergency call center, wherein the proximity location information's GUID is mapped to a database at the emergency call center to obtain a location of the emergency.

2. The method of claim 1, further comprising enabling a dispatcher at the emergency call center to receive the proximity location information, map the globally unique identifier (GUID) from the proximity location information to a database, and retrieve location information from the database to better instruct an emergency response team to respond to the emergency, the location information comprising a street address, a floor number, a room number, recommended street routes to the location, and recommended stairway access.

3. The method of claim 1, wherein additional information is added to the proximity location information prior to transmitting the proximity location information to the emergency call center, wherein the additional information comprises at least one of the user's name, a telephone number of a mobile device used to dial the emergency telephone number, a person to call in case of emergency, and medical information about the user.

4. The method of claim 1, wherein additional information is added to the proximity location information prior to transmitting the proximity location information to the emergency call center, wherein the additional information comprises location information received from at least one of a global positioning system, a wireless local area network (LAN), and distance measuring.

5. The method of claim 1, wherein a mobile device is used to dial the emergency call number, wherein the mobile device comprises a cell phone.

6. The method of claim 5, wherein the cell phone includes a plurality of body sensors for extracting vital signs of the user.

7. The method of claim 6, wherein the plurality of body sensors comprise at least one of a temperature body sensor, a pulse body sensor, and a heartbeat body sensor.

8. The method of claim 7, wherein additional information is added to the proximity location information prior to transmitting the proximity location information to the emergency call center, wherein the additional information comprises one or more of temperature, pulse, and heartbeat information from the user.

9. The method of claim 1, wherein the emergency call center comprises a public safety answering point.

10. The method of claim 1, wherein the emergency call number comprises 911.

11. The method of claim 1, wherein the one location identifying beacon periodically chirps the proximity location information using one of a radio frequency identification (RFID), an infrared (IR), an ultra wide band (UWB), and a Bluetooth short-range signal.

12. The method of claim 1, wherein a mobile device receives the proximity location information from the one location identifying beacon, wherein the mobile device comprises an additional receiver/transmitter or infrared (IR) port for receiving the proximity location information.

13. The method of claim 1, wherein a user-friendly location of the emergency is displayed back to the user via a mobile device to inform the user of the location of the emergency.

14. An article comprising: a storage medium having a plurality of machine accessible instructions, wherein when the instructions are executed by a processor, the instructions provide for receiving proximity location information comprising a globally unique identifier (GUID) from at least one short range location identification beacon; and enabling a user to dial an emergency telephone number if an emergency occurs, wherein dialing the emergency telephone number enables the proximity location information to be transmitted to an emergency call center, wherein the proximity location information's GUID is mapped to a database of the emergency call center to obtain a location of the emergency.

15. The article of claim 14, further comprising instructions for receiving the proximity location information from the at least one location identifying beacon via a mobile device, wherein the mobile device comprises an additional receiver/transmitter for receiving the proximity location information.

16. The article of claim 14, wherein the instructions further provide for adding additional information to the proximity location information prior to transmitting the proximity location information to the emergency call center, wherein the additional information comprises at least one of the user's name, a telephone number of a mobile device used to dial the emergency telephone number, a person to call in case of emergency, and medical information about the user.

17. The article of claim 14, wherein the instructions further provide for adding additional information to the proximity location information prior to transmitting the proximity location information to the emergency call center, wherein the additional information comprises location information received from at least one of a global positioning system, a wireless local area network (LAN), and distance measuring.

18. The article of claim 14, wherein a mobile device is used to dial the emergency call number, wherein the mobile device comprises a cell phone.

19. The article of claim 18, wherein the cell phone comprises a plurality of body sensors for extracting vital signs of the user.

20. The article of claim 19, wherein the plurality of body sensors comprise at least one of a temperature body sensor, a pulse body sensor, and a heartbeat body sensor.

21. The article of claim 20, the instructions further provide for adding additional information to the proximity location information prior to transmitting the proximity location information to the emergency call center, wherein the additional information comprises one or more of temperature, pulse, and heartbeat information from the user.

22. The article of claim 14, wherein the emergency call center comprises a public safety answering point.

23. The article of claim 14, wherein the emergency call number comprises 911.

24. The article of claim 14, further comprising instructions for enabling the at least one location identifying beacon to periodically chirp the proximity location information using one of a radio frequency identification (RFID), an infrared (IR), an ultra wide band (UWB), and a Bluetooth short-range signal.

25. The article of claim 14, further comprising instructions for enabling a dispatcher at the emergency call center to receive the proximity location information, map the globally unique identifier (GUID) from the proximity location information to a database, and retrieve location information from the database to better instruct an emergency response team to respond to the emergency.

26. The article of claim 25, wherein the location information comprises a street address, a floor number, a room number, recommended street routes to the location, and recommended stairway access.

27. A method for determining location during an emergency comprising:

transmitting a distress message from a mobile device to at least one smoke detector, wherein the transmission of the distress message is triggered by a caller dialing an emergency call number on the mobile device during an emergency; and enabling the at least one smoke detector to sound an alarm upon receiving the distress message, wherein the distress message and an identity signal of the at least one smoke detector are transmitted from the at least one smoke detector to an alarm system infrastructure, the alarm system infrastructure being connected to an emergency call center, wherein the identity signal of the at least one smoke detector is mapped to a database at the emergency call center to obtain a location of the emergency.

28. The method of claim 27, further comprising enabling a dispatcher at the emergency call center to retrieve the location of the emergency from the database to better instruct an emergency response team to respond to the emergency in a timely manner.

29. The method of claim 27, wherein the mobile device comprises a cell phone, and the distress message comprises one or more of the caller's name, a telephone number of the cell phone, a serial number of the cell phone, a person to call in case of emergency, and medical information about the caller.

30. The method of claim 27, wherein the alarm is different from a fire alarm to discern between a fire and another type of emergency.

31. The method of claim 27, wherein the identity signal of the at least one smoke detector comprises a globally unique identifier (GUID), and wherein the GUID is mapped to a database at the emergency call center to obtain the location of the emergency.

32. The method of claim 27, wherein the location of the emergency comprises one or more of a street address, latitude/longitude information, floor number, room number, text describing a building in which the emergency occurred, recommended street routes to the building, and a recommended stairway access.

33. An article comprising: a storage medium having a plurality of machine accessible instructions, wherein when the instructions are executed by a processor, the instructions provide for transmitting a distress message from a mobile device to at least one smoke detector, wherein the transmission of the distress message is triggered by a caller dialing an emergency call number on the mobile device during an emergency; and enabling the at least one smoke detector to sound an alarm upon receiving the distress message, wherein the distress message and an identity signal of the at least one smoke detector are transmitted from the at least one smoke detector to an alarm system infrastructure, the alarm system infrastructure being connected to an emergency call center, wherein the identity signal of the at least one smoke detector is mapped to a database at the emergency call center to obtain a location of the emergency.

34. The article of claim 33, further comprising instructions for enabling a dispatcher at the emergency call center to retrieve the location of the emergency from the database to better instruct an emergency response team to respond to the emergency in a timely manner.

35. The article of claim 33, wherein the mobile device comprises a cell phone, and the distress message comprises one or more of the caller's name, a telephone number of the cell phone, a serial number of the cell phone, a person to call in case of emergency, and medical information about the caller.

36. The article of claim 33, wherein the sound of the alarm is different from a fire alarm to discern between a fire and another type of emergency.

37. The article of claim 33, wherein the identity signal of the at least one smoke detector comprises a globally unique identifier (GUID), wherein the article further comprises instructions for mapping the GUID to a database at the emergency call center to obtain the location of the emergency.

38. The article of claim 33, wherein the location of the emergency comprises one or more of a street address, latitude/longitude information, floor number, room number, text describing a building in which the emergency occurred, recommended street routes to the building, and a recommended stairway access.

39. A system for location-awareness comprising:

at least one location identification beacon, wherein the at least one location identification beacon periodically chirps a proximity location signal using a short-range transmission signal, wherein the proximity location signal comprises a globally unique identifier (GUID); and a mobile device for receiving the proximity location signal from the at least one location identification beacon, wherein a caller during an emergency situation triggers the mobile device to transmit the proximity location signal to an emergency call center by calling an emergency telephone number, wherein the proximity location signal's GUID is mapped to a database at the emergency call center to obtain and provide location information of the emergency location to an emergency response team to enable the emergency response team to respond to the emergency in a timely manner.

40. The system of claim 39, wherein the mobile device comprises one of a cell phone, a pager, a personal digital assistant, and an alarm button.

41. The system of claim 39, wherein the mobile device comprises an additional receiver/transmitter for receiving the location information from the at least one location identification beacon.

42. A location-awareness system, comprising:

a mobile device to transmit a distress message to at least one smoke detector, wherein the transmission of the distress message is triggered by a caller dialing an emergency telephone number during an emergency; and an alarm system infrastructure, the alarm system infrastructure coupled to an emergency call center;

wherein an alarm is sounded when the distress message is received by the at least one smoke detector, wherein the distress message and an identity signal for the at least one smoke detector are transmitted to the emergency call center via the alarm system infrastructure, wherein the identity signal for the at least one smoke detector is mapped to a database at the emergency call center to provide location information for the emergency.

43. The system of claim 42, wherein the identity signal comprises a globally unique identifier (GUID) and wherein the GUID is mapped to a database at the emergency call center to provide location information for the emergency.

44. The system of claim 42, wherein the mobile device comprises one of a cell phone, a pager, a personal digital assistant, and an alarm button.

45. The system of claim 42, wherein the mobile device comprises an additional receiver/transmitter for transmitting the distress message to the at least one smoke detector.

* * * * *